United States Patent
Landon et al.

(10) Patent No.: US 7,674,857 B2
(45) Date of Patent: *Mar. 9, 2010

(54) ROOM TEMPERATURE-CURED SILOXANE SEALANT COMPOSITIONS OF REDUCED GAS PERMEABILITY

(75) Inventors: Shayne J. Landon, Ballston Lake, NY (US); David A. Williams, Ganesvoort, NY (US); Vikram Kumar, Bangalore (IN); Sachin Askok Shelukar, Bangalore (IN); Edward Joseph Nesakumar, Bangalore (IN); Indumathi Ramakrishnan, Bangalore (IN)

(73) Assignee: Momentive Performance Materials Inc., Albany, NY (US)

( * ) Notice: Subject to any disclaimer, the term of this patent is extended or adjusted under 35 U.S.C. 154(b) by 667 days.

This patent is subject to a terminal disclaimer.

(21) Appl. No.: 11/283,395

(22) Filed: Nov. 18, 2005

(65) Prior Publication Data

US 2007/0117926 A1    May 24, 2007

(51) Int. Cl.
C08L 83/04    (2006.01)
(52) U.S. Cl. .............. 525/100; 525/104; 525/105; 525/106; 525/446; 525/464; 525/474; 524/424; 524/425; 524/437; 524/445; 524/448; 528/17; 528/34; 528/39
(58) Field of Classification Search .............. None
See application file for complete search history.

(56) References Cited

U.S. PATENT DOCUMENTS

| | | | |
|---|---|---|---|
| 4,138,387 A * | 2/1979 | Bluestein ............ 524/425 |
| 5,013,781 A | 5/1991 | Koshii et al. |
| 5,027,574 A | 7/1991 | Phillip |
| 5,051,311 A | 9/1991 | Popa et al. |
| 5,082,706 A | 1/1992 | Tangney |
| 5,120,379 A | 6/1992 | Noda et al. |
| 5,126,403 A * | 6/1992 | Graiver et al. ............ 525/58 |
| 5,544,465 A | 8/1996 | Hood et al. |
| 5,567,530 A | 10/1996 | Drujon et al. |
| 5,784,853 A | 7/1998 | Hood et al. |
| 5,804,253 A | 9/1998 | Hagiwara et al. |
| 5,849,832 A | 12/1998 | Virnelson et al. |
| 6,136,446 A | 10/2000 | Virnelson et al. |
| 6,136,910 A | 10/2000 | Virnelson et al. |
| 6,150,441 A | 11/2000 | Chiba et al. |
| 6,153,691 A * | 11/2000 | Gornowicz et al. ....... 524/861 |
| 6,238,755 B1 | 5/2001 | Harvey et al. |
| 6,284,360 B1 | 9/2001 | Johnson et al. |
| 6,372,827 B2 | 4/2002 | Johnson et al. |
| 6,406,782 B2 | 6/2002 | Johnson et al. |
| 6,445,158 B1 | 9/2002 | Bertness et al. |
| 6,457,294 B1 | 10/2002 | Virnelson et al. |
| 6,465,107 B1 * | 10/2002 | Kelly ............ 428/447 |
| 6,645,339 B1 | 11/2003 | DeCato |
| 6,703,120 B1 | 3/2004 | Ko et al. |
| 6,713,547 B2 | 3/2004 | Barbee et al. |
| 6,761,976 B2 * | 7/2004 | Cottevieille et al. ....... 428/447 |
| 6,784,272 B2 | 8/2004 | Mack et al. |
| 6,812,272 B2 | 11/2004 | Fischer |
| 6,822,035 B2 | 11/2004 | Chaiko |
| 6,828,403 B2 | 12/2004 | Mahdi et al. |
| 2002/0055567 A1 * | 5/2002 | Romenesko et al. ....... 524/261 |
| 2002/0100550 A1 | 8/2002 | Mahdi et al. |
| 2002/0119266 A1 | 8/2002 | Bagrodia et al. |
| 2002/0194813 A1 | 12/2002 | Virnelson et al. |
| 2004/0127629 A1 | 7/2004 | Jacob et al. |
| 2004/0188016 A1 | 9/2004 | Mahdi et al. |
| 2004/0258628 A1 | 12/2004 | Riedel et al. |
| 2005/0192837 A1 | 9/2005 | Fears et al. |
| 2005/0203235 A1 | 9/2005 | Gong et al. |
| 2006/0054053 A1 * | 3/2006 | Masutani et al. .......... 106/2 |
| 2007/0117926 A1 | 5/2007 | Landon et al. |
| 2007/0173596 A1 * | 7/2007 | Landon et al. ........... 524/588 |
| 2007/0173597 A1 * | 7/2007 | Williams et al. ......... 524/588 |

FOREIGN PATENT DOCUMENTS

| | | |
|---|---|---|
| EP | 0 220 809 | 5/1987 |
| EP | 0520777 | 12/1992 |
| EP | 0857761 | 8/1998 |
| EP | 0 994 151 | 4/2000 |
| GB | 2249552 | 5/1992 |
| WO | WO 97/31057 | 8/1997 |
| WO | 99/45072 | 9/1999 |
| WO | WO 02064676 | 8/2002 |
| WO | WO 2004/067658 * | 8/2004 |

OTHER PUBLICATIONS

Peter C. LeBaron et al., "Clay Nanolayer Reinforcement of a Silicone Elastomer", 2001.
Shelly D. Burnside et al., "Nanostructure and Properties of Polysiloxane-Layered Silicate Nanocomposites", Mar. 28, 2000.
K. Mizoguchi et al., "Miscibility and gas permeability of poly (ethylene-co-5,4 mol% 3,5,5-trimethylhexyl methacrylate)-polydimethyl-siloxane blends", 1997.
Y. Geerts et al., "Morphology and Permeability of Polymer Blends-I. Crosslinked EPDM-Silicone Blends", 1996.

* cited by examiner

*Primary Examiner*—Marc S Zimmer
(74) *Attorney, Agent, or Firm*—Dominick G. Vicari

(57) ABSTRACT

The present invention provides for a room temperature cured silicone thermoplastic resin sealant composition with reduced gas permeability useful in the manufacture of glazing such as windows and doors.

53 Claims, 3 Drawing Sheets

ROOM TEMPERATURE-CURED SILOXANE
SEALANT COMPOSITIONS OF REDUCED
GAS PERMEABILITY

FIELD OF THE INVENTION

This invention relates to room temperature cured compositions of diorganopolysiloxanes polymer blends having reduced gas permeability and methods of using these compositions. The compositions are particularly well suited for use in the window area as an insulating glass sealant and in applications such as coatings, adhesives and gaskets.

BACKGROUND OF THE INVENTION

Room temperature curable compositions are well known for their use as sealants. In the manufacture of Insulating glass (IGU), for example, panels of glass are placed parallel to each other and sealed at their periphery such that the space between the panels, or the inner space, is completely enclosed. The inner space is typically filled with a low conductivity gas or mixture of gases.

One of the disadvantages of sealant compositions is their permeability to low conductivity energy transfer gases (e.g. argon) used to enhance the performance of insulated glass units. As a result of this permeability, the reduced energy transfer maintained by the gas between the panels of glass is lost over time.

There remains a need for sealants with good barrier protection that overcomes the deficiencies described above, and is highly suitable for applications that are easy to apply and have excellent adhesion.

SUMMARY OF THE INVENTION

The present invention is based on the discovery that a diorganopolysiloxane polymer or blend thereof exhibiting permeability to a gas and at least one polymer having a permeability to a gas or mixture of gases that is less than the permeability of diorganopolysiloxane polymer provides a sealant that has improved gas barrier properties along with the desired characteristics of softness, processability, and elasticity. Specifically, the present invention relates to a curable sealant composition comprising: (a) diorganopolysiloxane exhibiting permeability to gas; (b) at least one polymer having a permeability to gas that is less than the permeability of diorganopolysiloxane polymer (a); (c) cross-linker; and (d) catalyst for the cross-linker reaction.

These compositions advantageously provide for longer service life of insulated glass units (IGU).

DETAILED DESCRIPTION OF THE INVENTION

Figure 1:
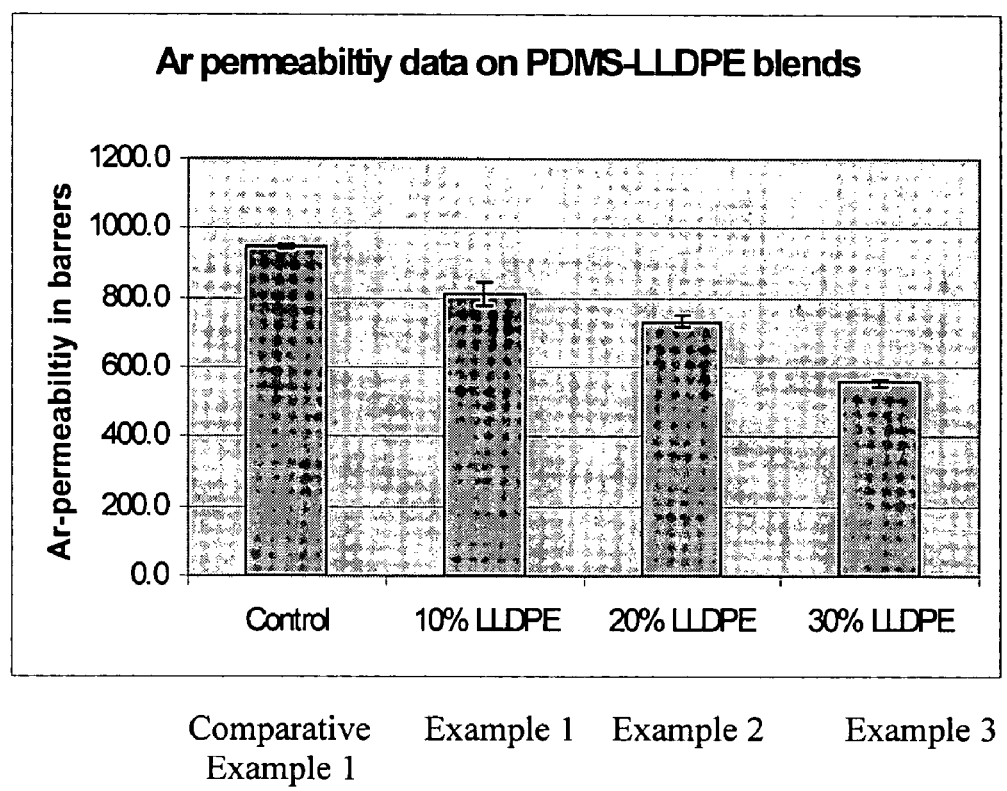
FIG. 1 is a graph illustration of the permeability of Examples 1-3 to argon gas.

In accordance with the present invention, the sealant compositions exhibit lowered permeability to gas, or mixtures of gases, by blending diorganopolysiloxane exhibiting permeability to gas; (b) at least one polymer having a permeability to gas that is less than the permeability of diorganopolysiloxane polymer. (a); (c) cross-linker; and (d) catalyst for the cross-linker reaction.

The sealant composition of the present invention may further comprise an optional component, such as, filler, adhesion promoter, non-ionic surfactant, and the like and mixtures thereof.

The present invention comprises diorganopolysiloxane polymer or blend thereof and at least one additional polymer. A general description of each of the components of the formulation are given as follows:

(a) a diorganopolysiloxane or blend of diorganopolysiloxanes exhibiting permeability to a gas or mixtures of gases wherein the silicon atom at each polymer chain end is silanol terminated; whereby the viscosity of the siloxanes can be from about 1,000 to 200,000 cps at 25° C.;

(b) a polymer exhibiting permeability to a gas or mixture of gases that is less than the permeability of diorganopolysiloxane polymer (a);

(c) an alkylsilicate cross-linker of the general formula:

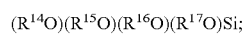

(d) a catalyst useful for facilitating crosslinking in silicone sealant compositions.

The silanol terminated diorganopolysiloxane polymer (a), generally has the formula:

with the subscript a=2 and b equal to or greater than 1 and with the subscript c zero or positive where

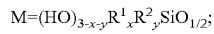

with the subscript x=0, 1 or 2 and the subscript y is either 0 or 1, subject to the limitation that x+y is less than or equal to 2, where $R^1$ and $R^2$ are independently chosen monovalent $C_1$ to $C_{60}$ hydrocarbon radicals; where

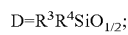

where $R^3$ and $R^4$ are independently chosen monovalent $C_1$ to $C_{60}$ hydrocarbon radicals; where

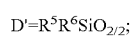

where $R^5$ and $R^6$ are independently chosen monovalent $C_1$ to $C_{60}$ hydrocarbon radicals.

In one embodiment of the invention, the level of incorporation of the diorganopolysiloxane wherein the silicon atom at each polymer chain end is silanol terminated (a) ranges from about 50 weight percent to about 99 weight percent of the total composition. In another embodiment of the invention, the level of incorporation of the diorganopolysiloxane polymer or blends of diorganopolysiloxane polymers (a) ranges from about 60 weight percent to about 95 weight percent of the total composition. In yet another embodiment of the present invention, the diorganopolysiloxane polymer or blends of diorganopolysiloxane polymers (a) ranges from about 65 weight percent to about 95 weight percent of the total composition.

The silicone composition of the present invention further comprises at least one polymer (b) exhibiting permeability to a gas or mixture of gases that is less than the permeability of diorganopolysiloxane polymer (a).

Suitable polymers include, but are not limited to, polyethylenes, such as, low density polyethylene (LDPE), very low density polyethylene (VLDPE), linear low density polyethylene (LLDPE) and high density polyethylene (HDPE);

polypropylene (PP), polyisobutylene (PIB), polyvinyl acetate (PVAc), polyvinyl alcohol (PVoH), polystyrene, polycarbonate, polyester, such as, polyethylene terephthalate (PET), polybutylene terephthalate (PBT), polyethylene napthalate (PEN), glycol-modified polyethylene terephthalate (PETG); polyvinylchloride (PVC), polyvinylidene chloride, polyvinylidene floride, thermoplastic polyurethane (TPU), acrylonitrile butadiene styrene (ABS), polymethylmethacrylate (PMMA), polyvinyl fluoride (PVF), Polyamides (nylons), polymethylpentene, polyimide (PI), polyetherimide (PEI), polether ether ketone (PEEK), polysulfone, polyether sulfone, ethylene chlorotrifluoroethylene, polytetrafluoroethylene (PTFE), cellulose acetate, cellulose acetate butyrate, plasticized polyvinyl chloride, ionomers (Surtyn), polyphenylene sulfide (PPS), styrene-maleic anhydride, modified polyphenylene oxide (PPO), and the like and mixture thereof.

The polymers can also be elastomeric in nature, examples include, but are not limited to ethylene-propylene rubber (EPDM), polybutadiene, polychloroprene, polyisoprene, polyurethane (TPU), styrene-butadiene-styrene (SBS), styrene-ethylene-butadiene-styrene (SEEBS), polymethylphenyl siloxane (PMPS), and the like.

These polymers can be blended either alone or in combinations or in the form of coplymers, e.g. polycarbonate-ABS blends, polycarbonate polyester blends, grafted polymers such as, silane grafted polyethylenes, and silane grafted polyurethanes.

In one embodiment of the present invention, the sealant composition has a polymer selected from the group consisting of low density polyethylene (LDPE), very low density polyethylene (VLDPE), linear low density polyethylene (LLDPE), high density polyethylene (HDPE), and mixtures thereof. In another embodiment of the invention, the sealant composition has a polymer selected from the group consisting of low density polyethylene (LDPE), very low density polyethylene (VLDPE), linear low density polyethylene (LLDPE), and mixture thereof. In yet another embodiment of the present invention, the sealant composition polymer is linear low density polyethylene (LLDPE).

In one embodiment of the present invention, the sealant composition contains from about 50 to about 99 weight percent diorganopolysiloxane polymer and from about 1 to about 50 weight percent polymer (b). In another embodiment of the present invention, the sealant composition contains from about 60 to about 95 weight percent diorganopolysiloxane polymer and from about 5 to about 40 weight percent polymer (b). In yet another embodiment of the present invention, the sealant composition contains from about 65 to about 95 weight percent diorganopolysiloxane polymer and from about 5 to about 35 weight percent polymer (b).

The blending method of diorganopolysiloxane polymer (a) with polymer (b) may be performed by those methods know in the art, for example, melt blending, solution blending or mixing of polymer powder component (b) in diorganopolysiloxane polymer (a).

Suitable cross-linkers (c) for the siloxanes of the sealant composition may include an alkylsilicate of the general formula:

$(R^{14}O)(R^{15}O)(R^{16}O)(R^{17}O)Si$ where $R^{14}$, $R^{15}$, $R^{16}$ and $R^{17}$ are independently chosen monovalent $C_1$ to $C_{60}$ hydrocarbon radicals.

Crosslinkers useful herein include, but are not limited to, tetra-N-propylsilicate (NPS), tetraethylortho silicate and methyltrimethoxysilane and similar alkyl substituted alkoxysilane compositions, and the like.

In one embodiment of the present invention, the level of incorporation of the alkylsilicate (crosslinker) ranges from about 0.1 weight percent to about 10 weight percent. In another embodiment of the invention, the level of incorporation of the alkylsilicate (crosslinker) ranges from about 0.3 weight percent to about 5 weight percent. In yet another embodiment of the present invention, the level of incorporation of the alkylsilicate (crosslinker) ranges from about 0.5 weight percent to about 1.5 weight percent of the total composition.

Suitable catalysts (d) can be any of those known to be useful for facilitating crosslinking in silicone sealant compositions. The catalyst may include metal and non-metal catalysts. Examples of the metal portion of the metal condensation catalysts useful in the present invention include tin, titanium, zirconium, lead, iron cobalt, antimony, manganese, bismuth and zinc compounds.

In one embodiment of the present invention, tin compounds useful for facilitating crosslinking in silicone sealant compositions include: tin compounds such as dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tinbutyrate, and the like. In still another embodiment, tin compounds useful for facilitating crosslinking in silicone sealant compositions are chelated titanium compounds, for example, 1,3-propanedioxytitanium bis(ethylacetoacetate); di-isopropoxytitanium bis(ethylacetoacetate); and tetra-alkyl titanates, for example, tetra n-butyl titanate and tetra-isopropyl titanate. In yet another embodiment of the present invention, diorganotin bis β-diketonates is used for facilitating crosslinking in silicone sealant composition.

In one aspect of the present invention, the catalyst is a metal catalyst. In another aspect of the present invention, the metal catalyst is selected from the group consisting of tin compounds, and in yet another aspect of the invention, the metal catalyst is solubilized dibutyl tin oxide.

In one embodiment of the present invention, the level of incorporation of the catalyst, ranges from about 0.001 weight percent to about 1 weight percent of the total composition. In another embodiment off the invention, the level of incorporation of the catalyst, ranges from about 0.003 weight percent to about 0.5 weight percent of the total composition. In yet another embodiment of the present invention, the level of incorporation of the catalyst, ranges from about 0.005 weight percent to about 0.2 weight percent of the total composition.

The silicone compositions of the present invention further comprise an alkoxysilane or blend of alkoxysilanes as an adhesion promoter. In one embodiment, the adhesion promoter may be a combination blend of n-2-aminoethyl-3-aminopropyltrimethoxysilane and 1,3,5-tris(trimethoxysilylpropyl)isocyanurate. Other adhesion promoters useful in the present invention include but are not limited to n-2-aminoethyl-3-aminopropyltriethoxysilane, γ-aminopropyltriethoxysilane, γ-aminopropyltrimethoxysilane, aminopropyltrimethoxysilane, bis-γ-trimethoxysilypropyl)amine, N-Phenyl-γ-aminopropyltrimethoxysilane, triaminofinctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3, 4-epoxycyclohexyl)propyltrimethoxysilane,β-(3,4-epoxy-cyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, and n-ethyl-3-trimethoxysilyl-2-methylpropanamine, and the like.

The level of incorporation of the alkoxysilane (adhesion promoter) ranges from about 0.1 weight percent to about 20 weight percent. In one embodiment of the invention, the adhesion promoter ranges from about 0.3 weight percent to about 10 weight percent of the total composition. In another embodiment of the invention, the adhesion promoter ranges from about 0.5 weight percent to about 2 weight percent of the total composition.

The silicone compositions of the present invention may also comprise a filler. Suitable fillers of the present invention include, but are not limited to, ground, precipitated and colloidal calcium carbonates which is treated with compounds such as stearate or stearic acid, reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black and graphite or clays such as kaolin, bentonite or montmorillonite, talc, mica, and the like.

In one embodiment of the present invention, the filler is a calcium carbonate filler, silica filler or a mixture thereof. The type and amount of filler added depends upon the desired physical properties for the cured silicone composition. In another embodiment of the invention, the amount of filler is from 0 weight percent to about 80 weight percent of the total composition. In yet another embodiment of the invention, the amount of filler is from about 10 weight percent to about 60 weight percent of the total composition. In still another embodiment of the invention, the amount of filler is from about 30 weight percent to about 55 weight percent of the total composition. The filler may be a single species or a mixture of two or more species.

In a further embodiment of the present invention, the sealant composition contains an inorganic substance from the general class of so called "clays" or "nano-clays." "Organo-clays" are clays or other layered materials that have been treated with organic molecules (also called exfoliating agents or surface modifiers) capable of undergoing ion exchange reactions with the cations present at the interlayer surfaces of the layers.

In one embodiment of the invention, the clay materials used herein include natural or synthetic phyllosilicates, particularly smectic clays such as montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, talc, mica, kaolinite, as well as vermiculite, halloysite, aluminate oxides, or hydrotalcite, and the like and mixtures thereof. In another embodiment, other useful layered materials include micaceous minerals, such as illite and mixed layered illite/smectite minerals, such as rectorite, tarosovite, ledikite and admixtures of illites with the clay minerals named above. Any swellable layered material that sufficiently sorbs the organic molecules to increase the interlayer spacing between adjacent phyllosilicate platelets to at least 5 angstroms, or to at least 10 angstroms, (when the phyllosilicate is measured dry) may be used in the practice of this invention.

The aforementioned particles can be natural or synthetic such as smectite clay. This distinction can influence the particle size and for this invention, the particles should have a lateral dimension of between 0.01 μm and 5 μm, and preferably between 0.05 μm and 2 μm, and more preferably between 0.1 μm and 1 μm. The thickness or the vertical dimension of the particles can vary between 0.5 nm and 10 nm, and preferably between 1 nm and 5 nm.

In still another embodiment of the present invention, organic and inorganic compounds useful for treating or modifying the clays and layered materials include cationic surfactants such as ammonium, ammonium chloride, alkylammonium (primary, secondary, tertiary and quaternary), phosphonium or sulfonium derivatives of aliphatic, aromatic or arylaliphatic amines, phosphines or sulfides. Such organic molecules are among the "surface modifiers" or "exfoliating agents" discussed herein. Additional organic or inorganic molecules useful for treating the clays and layered materials include amine compounds (or the corresponding ammonium ion) with the structure $R^3 R^4 R^5 N$, wherein $R^3$, $R^4$, and $R^5$ are $C_1$ to $C_{30}$ alkyls or alkenes in one embodiment, $C_1$ to $C_{20}$ alkyls or alkenes in another embodiment, which may be the same or different. In one embodiment, the organic molecule is a long chain tertiary amine where $R^3$ is a $C_{14}$ to $C_{20}$ alkyl or alkene. In another embodiment, $R^4$ and or $R^5$ may also be a $C_{14}$ to $C_{20}$ alkyl or alkene. In yet another embodiment of the present invention, the modifier can be an amine with the structure $R^6 R^7 R^8 N$, wherein $R^6$, $R^7$, and $R^8$ are $C_1$ to $C_{30}$ alkoxy silanes or combination of $C_1$ to $C_{30}$ alkyls or alkenes and alkoxy silanes.

Suitable clays that are treated or modified to form organo-clays include, but are not limited to, montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and mixtures thereof. The organo-clays of the present invention may further comprise one or more of ammonium, primary alkylammonium, secondary alkylammonium, tertiary alkylammonium quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides. In one embodiment of the present invention, the organo-clay is an alkyl ammonium modified montmorillonite.

The amount of clay incorporated in the sealant composition of the present invention in accordance with embodiments of the invention, is preferably an effective amount to provide decrease the sealant's permeability to gas. In one embodiment of the present invention, the sealant composition of the present invention contains from 0 to about 50 weight percent nano-clay. In another embodiment, the compositions of the present invention have from about 1 to about 20 weight percent nano-clay.

The compositions of the present invention may optionally comprise non-ionic surfactant compound selected from the group of surfactants consisting of polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones and copolymers of ethylene oxide and propylene oxide and mixtures thereof in an amount ranging from slightly above 0 weight percent to about 10 weight percent, more preferably from about 0.1 weight percent to about 5 weight percent, and most preferably from about 0.5 weight percent to about 0.75 weight percent of the total composition.

The compositions of the present invention may be prepared using other ingredients that are conventionally employed in room temperature vulcanizing (RTV) silicone compositions such as colorants, pigments and plasticizers, as long as they do not interfere with the desired properties.

Furthermore, these compositions can be prepared using melt, solvent and in-situ polymerization of siloxane polymers as known in the art.

Preferably, the methods of blending the diorganopolysiloxane polymers with polymers may be accomplished by contacting the components in a tumbler or other physical blending means, followed by melt blending in an extruder. Alternatively, the components can be melt blended directly in an extruder, Brabender or any other melt blending means.

The invention is illustrated by the following non-limiting examples:

Polydimethyl Siloxane (PDMS) mixture (Silanol 5000 and silanol 50000, Gelest), was melt blended with LLDPE (melt flow index (MFI) 20, from Sabic) by Hake internal mixer at 150° C., 200RPM, for total mixing time of 12 minutes. Three (3) such blends were prepared with weight percent LLDPE of 10, 20 and 30, (see Example 1, 2 and 3, respectively, listed below), by the following procedure:

1. Mix silanols 5000 cPs and 50000 cPs in 1:1 ratio.
2. Add 70 percent of silanol mixture into the Hake mixer @ 150° C.
3. Start the experiment using program window.
4. Add LLDPE to the mixer in small amounts. Time of addition 1-2 minutes.
5. Add remaining mixture 30 percent of silanol into the mixer.
6. Continue mixing for total of 12 minutes.
7. At the end of $12^{th}$ minute the rotation stops automatically, collect the blended material into a glass petridish.

The following Examples were prepared from the batches obtained using above procedure:

Example 1=52 grams mix silanol (5000 and 50000 @ 50:50)+6 grams LLDPE

Example 2=48 grams mix silanol (5000 and 50000 @ 50:50)+12 grams LLDPE

Example 3=42 grams mix silanol (5000 and 50000 @ 50:50)+18 grams LLDPE

Example 1, 2 and 3, were then used to make cured sheets as follows: PDMS-LLDPE blends were mixed with n-propyl silicate (cross-linker, obtained from Gelest Chemicals, USA) and solubilized dibutyl tin oxide (DBTO)(catalyst, obtained from GE silicones, Waterford, USA), in amounts as shown in Table 1, using a hand blender for 5-7 minutes. Air bubbles were removed by vacuum and the mixture was poured in Teflon mould and kept for 24 hrs under ambient conditions (25° C. and 50 percent humidity). The cured sheets were removed from mould after 24 hours and kept at ambient temperature for seven days for complete curing.

TABLE 1

| Examples | Amount (Grams) | nPs ml | DBTO ml |
|---|---|---|---|
| Comparative Example 1 Silanol Mixture | 50 | 1 | 0.06 |
| Example 1 Silanol with 10 wt. % LLDPE | 50 | 0.9 | 0.05 |
| Example 2 | 50 | 0.72 | 0.04 |

TABLE 1-continued

| Examples | Amount (Grams) | nPs ml | DBTO ml |
|---|---|---|---|
| Silanol with 20 wt. % LLDPE | | | |
| Example 3 | 50 | 0.5 | 0.03 |
| Silanol with 30 wt. % LLDPE | | | |

The Argon permeability of Examples 1-3 and Comparative Example 1 was measured using a gas permeability set-up. The measurements were based on the variable-volume method at 100 PSI pressure and temperature of 25° C. Measurements were repeated under identical conditions for 2-3 times in order to ensure their reproducibility. The results of the permeability data are graphically displayed in FIG. 1.

The variable-volume method as displayed in FIG. 1 measures Argon (Ar) permeability in "barrer" units (0.0 to 1200.0). As shown in FIG. 1, Examples 1-3 displayed lowered Ar permeability relative to the Comparative Example 1.

Examples 5, 6 and 7 were prepared as follows:

Polydimethyl Siloxane (PDMS) mixture (Silanol 3000 and silanol 30000, GE silicones), was melt blended with LLDPE (melt flow index (MFI) 20, from Sabic) in an extruder at 150° C., along with the mixture of Hakenuka TDD $CaCO_3$ and Omya FT $CaCO_3$. The temperature settings of the barrel are given below in Table 2:

Comparative Example 4 was prepared as follows:

Polydimethyl Siloxane (PDMS) mixture (Silanol 3000 and silanol 30000, GE silicones), was melt blended in an extruder at 150° C., along with the mixture of Hakenuka TDD $CaCO_3$ and Omya FT $CaCO_3$. The temperature settings of the barrel are given below in Table 2:

TABLE 2

| Temp settings: | |
|---|---|
| Barrel 1-2 | 75° C. |
| Barrel 3-10 | 150° C. |
| Barrel 11-15 | cooling to 45° C. |

The feed rate was set at 50lbs/hr. The formulations of Comparative Example 4 and Examples 5, 6 and 7 are displayed in Table 3 and were produced in an extruder at 150° C.:

TABLE 3

| Examples | Silanol 3000 cps | Silanol 30000 cps | $CaCO_3$ (50:50 mixture of Hakenuka TDD and Omya FT | Sabic LLDPE | Talc |
|---|---|---|---|---|---|
| Comparative Example 4 | 25.0 | 25.0 | 50.0 | — | — |
| Example 5 | 22.7 | 22.7 | 50.0 | 4.7 | — |
| Example 6 | 20.0 | 20.0 | 50.0 | 10.0 | — |
| Example 7 | 20.0 | 20.0 | 25.0 | 10.0 | 25 |

The extruded material was collected in 6-ounce semco cartridges.

Comparative Example 4, and Examples 5, 6, and 7 were then used to make cured sheets as follows:

The PDMS-LLDPE blends of Examples 5-7 and Comparative Example 4 were mixed with Part B (catalyst mixture consists of solubilized dibutyl tin oxide, n-propyl silicate, aminopropyl triethoxysilane, carbon black and silicone oil )

in 12.5:1 ratio in semkit mixer for 6 minutes. The mixture was then poured in Teflon mould and kept for 24 hours under ambient conditions (25° C. and 50 percent humidity). The cured sheets were removed from mould after 24 hours and kept at ambient temperature for seven days for complete curing.

Figure 2:
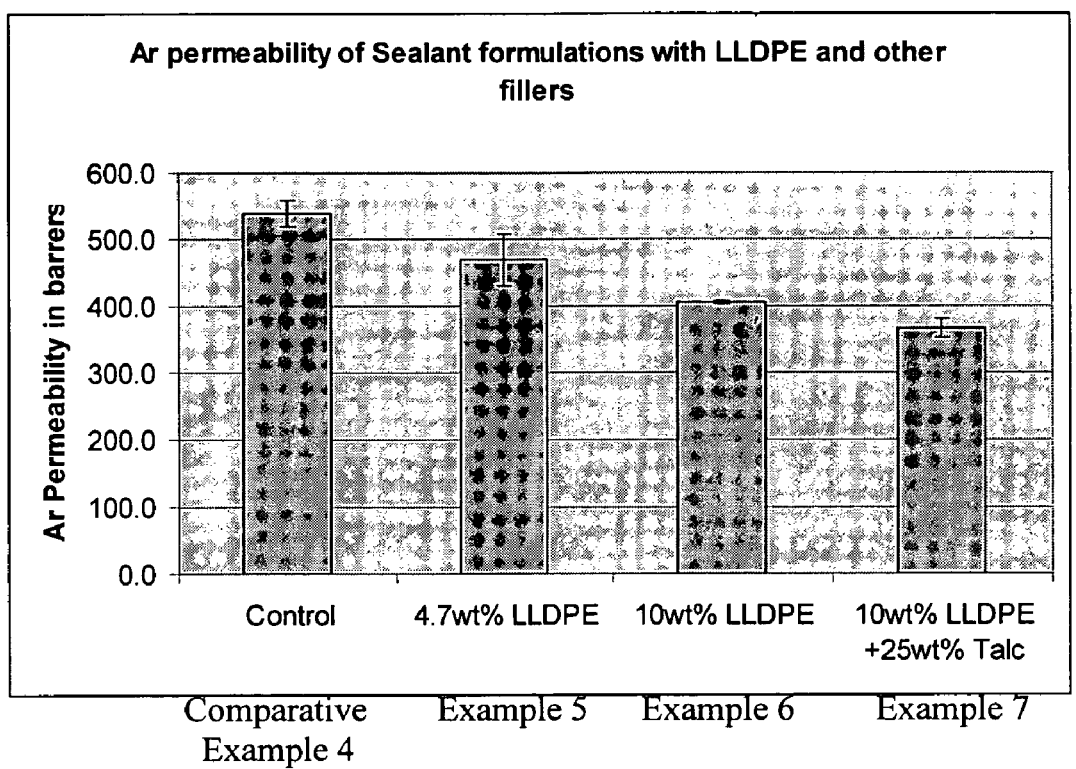
FIG. 2 is a graph illustration of the permeability of Example 5-7 to argon gas.
Figure 3:
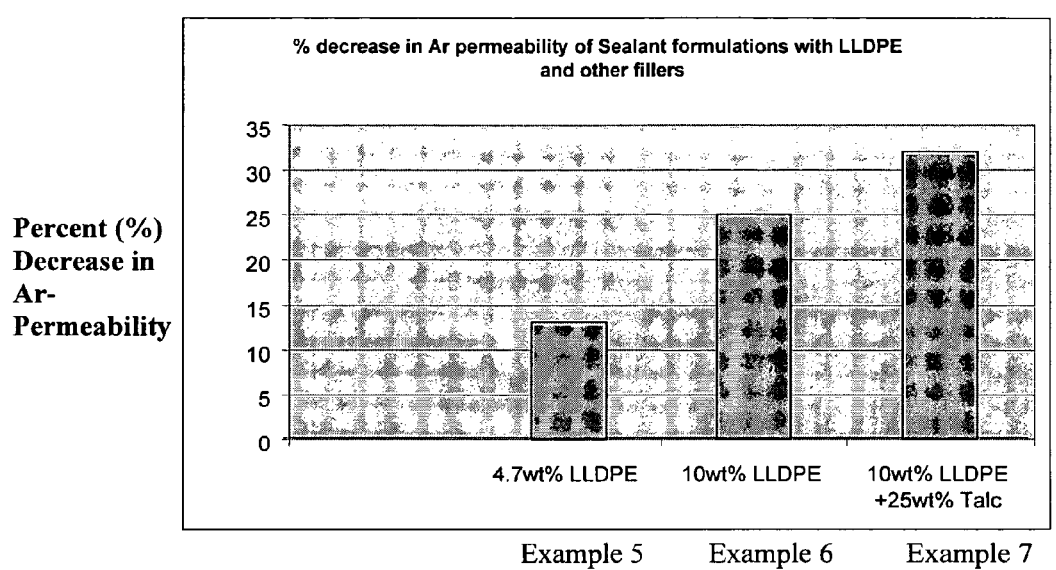
FIG. 3 is a graph illustration of percent decrease in permeability of Example 5-7 to argon gas.

The permeability data of Comparative Example 4, and Examples 5, 6, and 7 with LLDPE and fillers is displayed in FIGS. 2 and 3.

As shown in FIGS. 2 and 3, Examples 5-7 displayed lowered Ar permeability relative to Comparative Example 4.

While the preferred embodiment of the present invention has been illustrated and described in detail, various modifications of, for example, components, materials and parameters, will become apparent to those skilled in the art, and it is intended to cover in the appended claims all such modifications and changes which come within the scope of this invention.

What is claimed is:

1. A curable sealant composition comprising:
(a) diorganopolysiloxane exhibiting permeability to gas, wherein the diorganopolysiloxane ranges in amount of from about 50 weight percent to about 99 weight percent of the total composition;
(b) at least one polymer having a permeability to gas that is less than the permeability of diorganopolysiloxane polymer (a);
(c) cross-linker; and,
(d) catalyst for the cross-linker reaction wherein the cross-linkers (c) is an alkylsilicate having the formula:

where $R^{14}$, $R^{15}$, $R^{16}$ and $R^{17}$ are chosen independently from monovalent $C_1$ to $C_{60}$ hydrocarbon radicals, wherein said curable sealant composition, once cured has a permeability to argon of no more than about 800 barrer units at 25 degrees C. and under 100 psi pressure, said composition containing at least one adhesion promoter in an amount of from about 0.5 weight percent to about 20 weight percent of the total composition and further comprising a clay filler, wherein the clay is selected from the group consisting of montmorillonite, sodium montmorlloriite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and kaolinite, and mixtures thereof.

2. The sealant composition of claim 1 wherein polymer (b) is selected from the group consisting of low density polyethylene (LDPE), very low density polyethylene (VLDPE), linear low density polyethylene (LLDPE), high density polyethylene (HDPE), polypropylene (PP), polyisobutylene (PIB), polyvinyl acetate(PVAc), polyvinyl alcohol (PvoH), polystyrene, polycarbonate, polyester, such as, polyethylene terephthalate (PET), polybutylene terephthalate (PBT), polyethylene napthalate (PEN), glycol-modified polyethylene terephtalate (PETG); polyvinylchloride (PVC), polyvinylidene chloride, polyvinylidene fluoride, thermoplastic polyurethane (TPU), acrylonitrile butadiene styrene (ABS), polymethylmethacrylate (PMMA), polyvinyl fluoride (PVF), Polyamides (nylons), polymethylpentene, polyimide (PI), polyetherimide (PEI), polether ether ketone (PEEK), polysulfone, polyether sulfone, ethylene chlorotrifluoroethylene, polytetrafluoroethylene (PTFE), cellulose acetate, cellulose acetate butyrate, plasticized polyvinyl chloride, ionomers (Surtyn), polyphenylene sulfide (PPS), styrene-maleic anhydride, modified polyphenylene oxide (PPO), ethylene-propylene rubber (EPDM), polybutadiene, polychloroprene, polyisoprene, polyurethane (TPU), styrene-butadiene-styrene (SBS), styrene-ethylene-butadiene-styrene (SEEBS), polymethyiphenyl siloxane (PMPS), and mixture thereof.

3. The sealant composition of claim 2 wherein polymer (b) is selected from the group consisting of low density polyethylene (LDPE), very low density polyethylene (VLDPE), liner low density polyethylene (LLDPE), high density polyethylene (HDPE), and mixtures thereof.

4. The sealant composition of claim 1 containing a nonionic surfactant.

5. The sealant composition of claim 1 wherein the catalyst is a tin catalyst.

6. The sealant composition of claim 5 wherein the tin catalyst is selected from the group consisting of dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin trisuberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, diorganotin bis β-diketonates and mixtures thereof.

7. The sealant composition of claim 1 wherein the adhesion promoter is selected from the group consisting of N-2-aminoethyl-3-aminopropyltrimethoxysilane, 1,3,5-tris(trimethoxysilylpropyl)isocyanurate, γ-aminopropyltriethoxysilane, γ-aniinopropyltrimethoxysilane, aminopropyltrimethoxysilane, bis-γ-trimethoxysilypropyl) amine, N-phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3-dimethylbutyltrimethoxysilane, N-ethyl-3-trimethoxysilyl-2-methylpropanamine and mixtures thereof.

8. The sealant composition of claim 1, wherein the a diorganopolysiloxane polymer, component (a), ranges from in amount from about 60 weight percent to about 95 weight percent of the total composition.

9. The sealant composition of claim 1, wherein the polymer, component (b), ranges from in amount from about 1 weight percent to about 50 weight percent of the total composition.

10. The sealant composition of claim 1, wherein the polymer, component (b), ranges from in amount from about 5 weight percent to about 40 weight percent of the total composition.

11. The sealant composition of claim 1 further comprising at least one additional filler is selected from the group consisting of ground calcium carbonate, precipitated calcium carbonate, colloidal calcium carbonate, calcium carbonate treated with compounds stearate or stearic acid; fitmed silica, precipitated silica, silica gels, hydrophobized silicas, hydrophilic silica gels, crushed quartz, ground quartz, alumina, aluminum hydroxide, titanium hydroxide, clay, kaolin, bentonite montmorillonite, diatomaceous earth, iron oxide, carbon black and graphite, talc, mica, and mixtures thereof.

12. The sealant composition of claim 4 wherein the nonionic surfactant is selected from the group consisting of polyethylene glycol, polypropylene glycol, ethoxylated castor oil, oleic acid ethoxylate, alkyiphenol ethoxylates, copolymers of ethylene oxide and propylene oxide and copolymers of silicones and polyethers, copolymers of silicones and copolymers of ethylene oxide and propylene oxide and mixtures thereof in an amount ranging from about 0.1 weight percent to about 10 weight percent.

13. The sealant composition of claim 12 wherein the nonionic surfactant selected from the group consisting of copolymers of ethylene oxide and propylene oxide, copolymers of silicones and polyethers, copolymers of silicones and copolymers of ethylene oxide and propylene oxide and mixtures thereof.

14. The sealant composition of claim 1 wherein the amount of the cross-linker, component (c), ranges in amount from about 0.1 weight percent to about 10 weight percent of the total composition.

15. The sealant composition of claim 1 wherein the amount of catalyst, component (d), ranges in amount from about 0.005 weight percent to about 1 weight percent of the total composition.

16. The sealant composition of claim 1 wherein the amount of clay, ranges in amount from 0 to about 80 weight percent of the total composition.

17. The sealant composition of claim 1 wherein the clay is modified with an amine compound or the corresponding aninionium ion having the structure $R^3R^4R^5N$, wherein $R^3$, $R^4$, and $R^5$ are $C_1$ to $C_{30}$ ailcyls or alkenes, and mixtures thereof.

18. The sealant composition of claim 17 wherein $R^3$, $R^4$, and $R^5$ are $C_1$ to $C_{20}$ alkyls or alkenes, and mixtures thereof.

19. The sealant composition of claim 18 wherein clay is modified with a tertiary amine wherein $R^3$ a $C_{14}$ to $C_{20}$ alkyl or alkene, and mixtures thereof.

20. The sealant composition of claim 19 wherein $R^4$ and or $R^5$ is a $C_{14}$ to $C_{20}$ alkyl or alkene, and mixtures thereof.

21. The sealant composition of claim 1 wherein the clay is modified with an amine or the corresponding ammonium ion having the structure $R^6R^7R^8N$, wherein at least one $R^6$, $R^7$, and $R^8$ is $C_1$ to $C_{30}$ alkoxy silanes and the remaining are $C_1$ to $C_{30}$ alkyls or alkenes.

22. The sealant composition of claim 21 wherein at least one of $R^6$, $R^7$ and $R^8$ is a $C_1$ to $C_{20}$ alkoxy silanes and the remaining are $C_1$ to $C_{20}$ alkyls or alkenes.

23. The sealant composition of claim 1 wherein the clay is modified with ammoniuni chloride, or the corresponding primary alkylammonium, secondary alkylammonium, tertiary alkylammonium, or quaternary alkylanmionium cationic surfactants, phosphonium derivatives of aliphatic, aromatic or arylaliphatic amines, phosphines or sulfides or sulfonium derivatives of aliphatic, aromatic or arylaliphatic amines, phosphines or sulfides, and mixtures thereof.

24. The sealant composition of claim 1 wherein the clay is present in an amount from about 0.1 to about 50 weight percent of said composition.

25. The curable sealant composition of claim 1 having a permeability to argon of no more than about 400 barrer units at 25 degrees C. and under 100 psi pressure.

26. A curable sealant composition comprising:
(a) diorganopolysiloxane exhibiting permeability to gas, wherein the diorganopolysiloxane ranges in amount of from about 50 weight percent to about 99 weight percent of the total composition;
(b) at least one polymer having a permeability to gas that is less than the permeability of diorganopolysiloxane polymer (a);
(c) cross-linker; and
(d) catalyst for the cross-linker reaction wherein the cross-linkers (c) is an alkylsilicate having the formula:

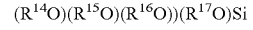
(R$^{14}$O)(R$^{15}$O)(R$^{16}$O))(R$^{17}$O)Si where $R^{14}$, $R^{15}$, $R^{16}$ and $R^{17}$ are chosen independently from monovalent $C_1$ to $C_{60}$ hydrocarbon radicals
wherein polymer (b) is selected from the group consisting of low density polyethylene (LDPE), very low density polyethylene (VLDPE), linear low density polyethylene (LLDPE), and mixture thereof.

27. The sealant composition of claim 26 wherein polymer (b) is linear low density polyethylene (LLDPE).

28. A curable sealant composition comprising:
(a) dioreanopolysiloxane exhibiting permeability to gas, wherein the diorganopolysiloxane polymer, component (a), is a silanol terminated diorganopolysiloxane;
(b) at least one polymer having a permeability to gas that is less than the permeability of diorganoyolvsiloxane polymer (a);
(c) cross-linker; and,
(d) catalyst for the cross-linker reaction wherein the cross-linkers (c) is an alkylsilicate having the formula:

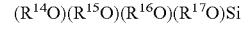
(R$^{14}$O)(R$^{15}$O)(R$^{16}$O)(R$^{17}$O)Si where $R^{14}$, $R^{15}$, $R^{16}$ and $R^{17}$ are chosen independently from monovalent $C_1$ to $C_{60}$ hydrocarbon radicals, wherein said curable sealant composition, once cured has a permeability to argon of no more than about 800 barrer units at 25 degrees C. and under 100 psi pressure, wherein polymer (b) is selected from the group consisting of low density polyethylene (LDPE), very low density polyethylene (VLDPE), linear low density polyethylene (LLDPE), and mixture thereof.

29. The sealant composition of claim 28 wherein polymer (b) is linear low density polyethylene (LLDPE).

30. The sealant composition of claim 28 containing at least one adhesion promoter in an amount of from about 0.5 weight percent to about 20 weight percent of the total composition and an optional component selected from the group consisting of filler and non-ionic surfactant.

31. The sealant composition of claim 28 wherein the catalyst is a tin catalyst.

32. The sealant composition of claim 31 wherein the tin catalyst is selected from the group consisting of dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin trisuberate, isobutyltin riceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, diorganotin bis β-diketonates and mixtures thereof.

33. The sealant composition of claim 30 wherein the adhesion promoter is selected from the group consisting of N-2-aminoethyl-3-aminopropyltrimethoxysilane, 1,3,5-tris(triniethoxysilylpropyl)isocyanurate, γ-aminopropyltriethoxysilane, γ-aminopropyltrimethoxysilane, aminopropyltrimethoxysilane, bis-γ-trimethoxysilypropyl)amine, N-phenyl-γ-aminopropyltrimethoxysilane, triaminofunctionaltrimethoxysilane, γ-aminopropylniethyldiethoxysilane, γ-aminopropylmethyldiethoxysilane, methaciyloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl) ethylmethyldimethoxysilane, isocyanatopropyltriethoxysilane, isocyanatopropylmethyldimethoxysilane, β-cyanoethyihimethoxysilane, γ-acryloxypropyltrimethoxysilane, γ-methacryloxypropylmethyldimethoxysilane, 4-amino-3,3-dimethylbutyltrimethoxysilane, N-ethyl-3-trimethoxysilyl-2-methylpropanamine and mixtures thereof.

34. The sealant composition of claim 28 wherein the a diorganopolysiloxane polymer, component (a), ranges in amount from about 50 weight percent to about 99 weight percent of the total composition.

35. The sealant composition of claim 28, wherein the a diorganopolysiloxane polymer, component (a), ranges in amount from about 60 weight percent to about 95 weight percent of the total composition.

36. The sealant composition of claim 28, wherein the polymer, component (b), ranges in amount from about 1 weight percent to about 50 weight percent of the total composition.

37. The sealant composition of claim 28, wherein the polymer, component (b), ranges in amount from about 5 weight percent to about 40 weight percent of the total composition.

38. The sealant composition of claim 30 wherein at least one filler is selected from the group consisting of clays, nanoclays, organo-clays, ground calcium carbonate, precipitated calcium carbonate, colloidal calcium carbonate, calcium carbonate treated with compounds stearate or stearic acid; fumed silica, precipitated silica, silica gels, hydrophobized silicas, hydrophilic silica gels, crushed quartz, ground quartz, alumina, aluminum hydroxide, titanium hydroxide, clay, kaolin, bentonite montmorillonite, diatomaceous earth, iron oxide, carbon black and graphite, talc, mica, and mixtures thereof.

39. The sealant composition of claim 30 wherein the non-ionic surfactant is selected from the group consisting of polyethylene glycol, polypropylene glycol, ethoxylated castor oil, oleic acid ethoxylate, alkylphenol ethoxylates, copolymers of ethylene oxide and propylene oxide and copolymers of silicones and polyethers, copolymers of silicones and copolymers of ethylene oxide and propylene oxide and mixtures thereof in an amount ranging from about 0.1 weight percent to about 10 weight percent.

40. The sealant composition of claim 39 wherein the non-ionic surfactant selected from the group consisting of copolymers of ethylene oxide and propylene oxide, copolymers of silicones and polyethers, copolymers of silicones and copolymers of ethylene oxide and propylene oxide and mixtures thereof.

41. The sealant composition of claim 28 wherein the amount of the cross-linker, component (c), ranges in amount from about 0.1 weight percent to about 10 weight percent of the total composition.

42. The sealant composition of claim 28 wherein the amount of catalyst, component (d), ranges in amount from about 0.005 weight percent to about 1 weight percent of the total composition.

43. The sealant composition of claim 30 wherein the amount of filler, ranges in amount from 0 to about 80 weight percent of the total composition.

44. The curable sealant composition of claim 28 having a permeability to argon of no more than about 400 barrer units at 25 degrees C. and under 100 psi pressure.

45. A curable sealant composition comprising:
(a) diorganonolysiloxane exhibiting permeability to gas, wherein the diorganopolysiloxane polymer, component (a), is a silanol terminated diorganonolvsiloxane;
(b) at least one polymer having a permeability to gas that is less than the permeability of diorganovolysiloxane polymer (a);
(c) cross-linker; and,
(d) catalyst for the cross-linker reaction wherein the cross-linkers (c) is an alkylsilicate having the formula:

where $R^{14}$, $R^{15}$, $R^{16}$ and $R^{17}$ are chosen independently from monovalent $C_1$ to $C_{60}$ hydrocarbon radicals, wherein said curable sealant composition, once cured has a permeability to argon of no more than about 800 barrer units at 25 degrees C. and under 100 psi pressure, said composition containing at least one adhesion Promoter in an amount of from about 0.5 weight percent to about 20 weight percent of the total composition and further comprising a clay, wherein the clay is selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and kaolinite, and mixtures thereof.

46. The sealant composition of claim 45 wherein the clay is modified with an amine compound or the corresponding ammonium ion having the structure $R^3 R^4 R^5 N$, wherein $R^3$, $R^4$, and $R^5$ are $C_1$ to $C_{30}$ alkyls or alkenes, and mixtures thereof.

47. The sealant composition of claim 46 wherein $R^3$, $R^4$, and $R^5$ are $C_1$ to $C_{20}$ alkyls or alkenes, and mixtures thereof.

48. The sealant composition of claim 47 wherein clay is modified with a tertiary amine wherein $R^3$ is a $C_{14}$ to $C_{20}$ alkyl or alkene, and mixtures thereof.

49. The sealant composition of claim 48 wherein $R^4$ and or $R^5$ is a $C_{14}$ to $C_{20}$ alkyl or alkene, and mixtures thereof.

50. The sealant composition of claim 45 wherein the clay is modified with an amine or the corresponding animonium ion having the structure $R^6 R^7 R^8 N$, wherein at least one $R^6$, $R^7$, and $R^8$ is $C_1$ to $C_{30}$ alkoxy silanes and the remaining are $C_1$ to $C_{30}$ alkyls or alkenes.

51. The sealant composition of claim 50 wherein at least one of $R^6$, $R^7$ and $R^8$ is a $C_1$ to $C_{20}$ alkoxy silanes and the remaining are $C_1$ to $C_{20}$ alkyls or alkenes.

52. The sealant composition of claim 45 wherein the clay is modified with ammonium chloride, or the corresponding primaiy alkylammoniuxn, secondary alkylammonium, tertiary alkylanimonium, or quaternaly alkylammonium cationic surfactants, phosphonium derivatives of aliphatic, aromatic or arylaliphatic amines, phosphines or sulfides or sulfonium derivatives of aliphatic, aromatic or arylaliphatic amines, phosphines or sulfides, and mixtures thereof.

53. The sealant composition of claim 45 wherein the clay is present in an amount from about 0.1 to about 50 weight percent of said composition.

* * * * *